(12) United States Patent
Yu et al.

(10) Patent No.: US 10,073,604 B2
(45) Date of Patent: Sep. 11, 2018

(54) UI-DRIVEN MODEL EXTENSIBILITY IN MULTI-TIER APPLICATIONS

(71) Applicant: Oracle International Corporation, Redwood Shores, CA (US)

(72) Inventors: Sherry Yu, Belmont, CA (US); Charu Chandra, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 46 days.

(21) Appl. No.: 14/277,993

(22) Filed: May 15, 2014

(65) Prior Publication Data
US 2015/0331596 A1    Nov. 19, 2015

(51) Int. Cl.
| G06F 3/0484 | (2013.01) |
| --- | --- |
| G06F 9/445 | (2018.01) |
| G06F 9/455 | (2018.01) |
| G06F 17/30 | (2006.01) |
| G06Q 10/06 | (2012.01) |
| G06F 9/451 | (2018.01) |
| G06F 9/44 | (2018.01) |

(52) U.S. Cl.
CPC ...... *G06F 3/04847* (2013.01); *G06F 3/04842* (2013.01); *G06F 9/4443* (2013.01); *G06F 9/451* (2018.02); *G06F 17/30398* (2013.01); *G06Q 10/063* (2013.01); *G06F 9/44505* (2013.01)

(58) Field of Classification Search
CPC ............ G06F 3/04842; G06F 3/04847; G06F 9/4443; G06F 9/44505; G06F 17/30398; G06F 9/451; G06Q 10/063

USPC ......... 717/124, 136; 715/221–223, 234, 243, 715/760, 762–763
See application file for complete search history.

(56) References Cited

U.S. PATENT DOCUMENTS

| 5,786,624 | A | * | 7/1998 | Havemann et al. | 257/635 |
| --- | --- | --- | --- | --- | --- |
| 5,959,624 | A | * | 9/1999 | Johnston et al. | 715/746 |
| 6,133,915 | A | * | 10/2000 | Arcuri et al. | 715/779 |
| 6,208,336 | B1 | * | 3/2001 | Carter | 715/866 |
| 6,973,626 | B1 | * | 12/2005 | Lahti | G06F 9/451 715/763 |

(Continued)

OTHER PUBLICATIONS

Patternry, "Inline Edit," Sep. 28, 2010, last retrieved from http://patternry.com/p=inline-edit/ on Sep. 5, 2016.*

(Continued)

*Primary Examiner* — Andrew M Lyons
(74) *Attorney, Agent, or Firm* — Trellis IP Law Group, PC

(57) ABSTRACT

A system and method for facilitating modifying a runtime application behavior and/or functionality of a networked software application, whereby UI-driven data model modifications effectively propagate back to the UI of the runtime application. The example method includes employing the runtime user interface display screen to present one or more indicators for one or more customizable user interface features of the runtime user interface display screen; generating one or more signals based upon user input, wherein the user input indicates a modification to be made to the one or more customizable user interface features; initiating one or more changes to a computing object and data model associated with the computing object in accordance with the one or more signals; and displaying a modified user interface display screen in accordance with the one or more changes.

20 Claims, 9 Drawing Sheets

(56) References Cited

U.S. PATENT DOCUMENTS

| | | | | |
|---|---|---|---|---|
| 6,983,421 | B1* | 1/2006 | Lahti | G06F 9/451 |
| | | | | 715/763 |
| 6,993,773 | B2* | 1/2006 | Broussard | G06F 8/38 |
| | | | | 715/762 |
| 7,089,295 | B2 | 8/2006 | Christfort et al. | |
| 7,266,777 | B2* | 9/2007 | Scott | G08C 17/02 |
| | | | | 348/734 |
| 7,287,227 | B2* | 10/2007 | Ries | G06F 17/3089 |
| | | | | 715/205 |
| 7,366,991 | B1* | 4/2008 | Snapkauskas et al. | 715/762 |
| 7,865,844 | B2* | 1/2011 | Lahiri | 715/854 |
| 7,886,269 | B2* | 2/2011 | Williams et al. | 717/121 |
| 8,117,562 | B2* | 2/2012 | Getsch | 715/843 |
| 8,302,014 | B2* | 10/2012 | Lezama Guadarrama et al. | |
| | | | | 715/744 |
| 8,302,020 | B2* | 10/2012 | Louch et al. | 715/764 |
| 8,407,577 | B1* | 3/2013 | Franklin et al. | 715/208 |
| 8,442,980 | B2* | 5/2013 | Sullivan | 707/736 |
| 8,555,188 | B2* | 10/2013 | Kim | G08C 17/02 |
| | | | | 715/718 |
| 8,689,178 | B2* | 4/2014 | Ambrose et al. | 717/108 |
| 8,798,775 | B2* | 8/2014 | Plache et al. | 700/83 |
| 8,826,158 | B1* | 9/2014 | Blair et al. | 715/762 |
| 8,972,872 | B2* | 3/2015 | Labrou | G06F 8/00 |
| | | | | 715/744 |
| 2003/0043192 | A1* | 3/2003 | Bouleau | 345/762 |
| 2005/0240869 | A1* | 10/2005 | Leetaru et al. | 715/530 |
| 2006/0248480 | A1* | 11/2006 | Faraday et al. | 715/866 |
| 2007/0038934 | A1* | 2/2007 | Fellman | 715/700 |
| 2007/0180386 | A1* | 8/2007 | Ballard et al. | 715/744 |
| 2008/0016555 | A1* | 1/2008 | Krane | 726/5 |
| 2008/0082572 | A1* | 4/2008 | Ballard et al. | 707/102 |
| 2008/0092041 | A1* | 4/2008 | Mathews | G06F 8/34 |
| | | | | 715/700 |
| 2008/0172603 | A1 | 7/2008 | Agarwal et al. | |
| 2009/0259950 | A1* | 10/2009 | Sullivan et al. | 715/762 |
| 2009/0292982 | A1* | 11/2009 | Choudhary | G06F 8/38 |
| | | | | 715/234 |
| 2009/0300656 | A1* | 12/2009 | Bosworth et al. | 719/320 |
| 2009/0319879 | A1* | 12/2009 | Scott | G06F 3/0481 |
| | | | | 715/205 |
| 2010/0039283 | A1* | 2/2010 | Ratcliff | G08C 17/00 |
| | | | | 340/12.53 |
| 2010/0077325 | A1* | 3/2010 | Barnea | G06F 9/4443 |
| | | | | 715/763 |
| 2010/0275144 | A1* | 10/2010 | Dejoras | G06F 3/04817 |
| | | | | 715/769 |
| 2011/0004837 | A1* | 1/2011 | Copland | G06F 3/0482 |
| | | | | 715/765 |
| 2011/0252334 | A1* | 10/2011 | Verma et al. | 715/744 |
| 2011/0289437 | A1* | 11/2011 | Yuen | G06F 17/3089 |
| | | | | 715/762 |
| 2011/0289520 | A1* | 11/2011 | Grigoriev | G06F 17/3089 |
| | | | | 719/331 |
| 2012/0084685 | A1* | 4/2012 | Heynen | G06F 8/38 |
| | | | | 715/763 |
| 2012/0167041 | A1* | 6/2012 | Payzer | G06F 21/6209 |
| | | | | 717/113 |
| 2012/0209754 | A1* | 8/2012 | Sivasubramaniam | 705/32 |
| 2012/0324377 | A1* | 12/2012 | Allington et al. | 715/763 |
| 2013/0073998 | A1* | 3/2013 | Migos | G06F 17/24 |
| | | | | 715/776 |
| 2013/0174015 | A1* | 7/2013 | Jeff L. | G06F 17/30905 |
| | | | | 715/234 |
| 2013/0219307 | A1* | 8/2013 | Raber | G06F 3/0484 |
| | | | | 715/763 |
| 2013/0247006 | A1* | 9/2013 | Trowbridge | 717/126 |
| 2013/0285920 | A1* | 10/2013 | Colley | 345/173 |
| 2014/0111422 | A1* | 4/2014 | Chow | 345/156 |
| 2014/0181703 | A1* | 6/2014 | Sullivan et al. | 715/762 |
| 2014/0181784 | A1* | 6/2014 | Sullivan et al. | 717/104 |
| 2014/0181788 | A1* | 6/2014 | Sullivan et al. | 717/109 |
| 2014/0258971 | A1* | 9/2014 | Jayadevan | G06F 8/38 |
| | | | | 717/105 |
| 2014/0282184 | A1* | 9/2014 | Dewan et al. | 715/771 |
| 2014/0379699 | A1* | 12/2014 | Blyumen | 707/722 |
| 2014/0380210 | A1* | 12/2014 | Blyumen et al. | 715/763 |
| 2014/0380219 | A1* | 12/2014 | Cartan | 715/771 |
| 2015/0089351 | A1* | 3/2015 | Logan | G06F 17/2247 |
| | | | | 715/234 |
| 2015/0169436 | A1* | 6/2015 | Tamilmani | G06F 11/3696 |
| | | | | 717/124 |

OTHER PUBLICATIONS

Stack Exchange, "Inline editing vs Edit view," Oct. 23, 2012, last retrieved from http://ux.stackexchange.com/questions/28210/inline-editing-vs-edit-view on Sep. 5, 2016.*

Cerny, Tomas et al., "Aspect-driven, Data-reflective and Context-aware User Interfaces Design," Applied Computing Review, vol. 13, No. 4, Dec. 2013, pp. 53-65. (Year: 2013).*

Criado, Javier et al., "A Model-Driven Approach to Graphical User Interface Runtime Adaptation," 2010, last retrieved from http://ceur-ws.org/Vol-641/paper_15.pdf on May 12, 2018. (Year: 2010).*

Puerta, Angel R. et al., "Beyond Data Models for Automated User Interface Generation," Proceedings of the Conference on People and Computers IX, 1994, pp. 353-366, last retrieved from http://www.arpuerta.com/pdf/hci94.pdf on May 12, 2018. (Year: 1994).*

Savdis, Anthony and Constantine Stephanidis, "Unified user interface development: the software engineering of universally accessible interactions," Journal Universal Access in the Information Society, vol. 3, Issue 3-4, Oct. 2004, pp. 165-193. (Year: 2004).*

Oracle Applications Flexfields Guide, Release 11; Mar. 1998; 395 pages.

Flexfields UI: Applications Usage Guideline; Version 2.0.0.0; Aug. 17, 2010; 43 pages.

Oracle Fusion Middleware Web User Interface Developer's Guide for Oracle Application Development Framework; 11g Release 2 (11.1.2.2.0) Copyright 2008; 24 pages.

Oracle Fusion Middleware Fusion Developer's Guide for Oracle Application Development Framework 11g Release 2 (11.1.2.2.0) Copyright 2008; 80 pages.

* cited by examiner

UI-DRIVEN MODEL EXTENSIBILITY IN MULTI-TIER APPLICATIONS

CROSS REFERENCES TO RELATED APPLICATIONS

This application is related to the following application, U.S. patent application Ser. No. 12/964,589, entitled MECHANISM TO INPUT, SEARCH AND CREATE COMPLEX DATA STRINGS WITHIN A SINGLE DIALOG, filed on Dec. 9, 2010; Ser. No. 13/693,964, entitled PERSISTENT LAYER LABELS FOR A PIVOT TABLE OR CROSS-TABULAR REPORT, filed on Dec. 4, 2012, and Ser. No. 14/137,917, entitled DYNAMICALLY GENERATED USER INTERFACE, filed on Dec. 20, 2013, which are hereby incorporated by reference, as if set forth in full in this specification.

BACKGROUND

The present application relates to software and more specifically to User Interface (UI) designs and methods for facilitating software modifications, such as modifications to UI models, data models, and accompanying UI display screen appearance and functionality.

Systems and methods for facilitating manipulating UI display screen features and functionality are employed in various demanding applications, including enterprise software development tools, general database design software, website development tools, and so on. Such applications often demand user friendly mechanisms for adding features and functionality to a UI display screen (e.g., "page"), such as by adding custom fields, enabling access to certain web services, modifying underlying data models, and so on, without requiring extensive software development skills or technical expertise.

Conventionally, software for facilitating UI modification required technical experts, e.g., developers, to develop code and deploy the code. To overcome technical knowledge requirements and time-consuming software code manipulation, some software applications employ separate UI manipulation programs with separate UI display screens designed to facilitate high-level UI modifications. For example, a special UI setup application may enable users to manipulate UI code of another application. After code modifications, the user may then redeploy the modified application; then navigate back to the modified UI display screen.

Such approaches to facilitating UI screen modification typically require users to switch between runtime and setup pages and further require users to know how to correlate options in setup pages with specific UI features to be customized or added.

However, users may not know or recall what to search for, how to search for it, or how to navigate to applicable sections of setup pages. Users may mistake an object corresponding to a UI feature to be customized with another object or UI feature or section shown in a setup screen. Furthermore, extensive UI feature changes may require multiple navigations between runtime pages and setup pages, which can be time-consuming and error prone.

SUMMARY

An example method for facilitating modifying a runtime UI display screen (also called a runtime page) of a networked software application includes employing the runtime UI display screen to present one or more indicators for one or more customizable UI features of the runtime UI display screen; generating one or more signals based upon user input, wherein the user input indicates a modification to be made to the one or more customizable UI features; initiating one or more changes to a computing object and data model associated with the computing object in accordance with the one or more signals; and displaying a modified UI display screen in accordance with the one or more changes.

In a more specific embodiment, context information pertaining to a given software-related task associated with a runtime UI display screen is employed to determine setup functionality. The setup functionality is accessible via inline setup tools for manipulating the one or more customizable UI features and associated UI controls. The inline setup tools are presented in a configuration-mode UI display screen that is visually or contextually representative of the runtime UI display screen to be modified. The configuration-mode UI screen may be representative of the runtime UI screen and may be visually similar to the runtime UI display screen, but augmented with indicators for modifiable features (e.g., fields) and with accompanying UI controls for facilitating implementing UI feature modifications. The configuration-mode UI screen may represent the runtime UI display screen after an overlay or blend with setup UI controls and functionality.

In the more specific embodiment, the example method further includes initiating a first change, based upon the one or more signals, to the data model. The data model characterizes a database containing the computing object. A second change is made to a UI model characterizing the runtime application. The second change is at least partially based upon the first change or vice versa. The database may be accessible to plural software applications via one or more servers that comprise a portion of a networked computing environment.

The example method may further include employing middleware in communication with one or more setup software applications and the database to facilitate effecting the first change. The middleware is adapted to automatically communicate information characterizing the first change to a second running networked software application, thereby deploying data model changes to the network. Note that UI display screens associated with other software applications accessing the database may, but not necessarily, automatically change based on changes to the data model and in accordance with middleware settings and functionality.

In the specific example embodiment, the one or more UI features include one or more user customizable fields, where the user may be an administrator, business user, or other person with login credentials permitting UI feature modifications. Customizable fields may (but not necessarily) be selected for display in the UI display screen based on context information associated with the UI display screen and the one or more customizable fields.

The customizable fields may (but not necessarily) be indicated via one or more flexfields. One or more UI controls may act as indicators and/or inline controls, which are positioned in proximity to the one or more flexfields. Each flexfield may be associated with one or more modifiable computing objects maintained via a server-side backend database.

Examples of inline UI controls include a UI control that is adapted to provide a first user option to trigger adding a new field in proximity to the inline UI control. The inline UI control may include a UI control that provides a second user option to edit a customized field, such as by adjusting properties, data of associated computing objects, behaviors, and so on.

Inline UI controls may provide user options to trigger display of dialog boxes that include additional UI controls for facilitating modifying UI features. Content and functionality provided via the dialog boxes may reflect context information present in the UI display screen near the UI control. The dialog boxes may include user options for modifying the one or more UI features.

Any modifications to customizable UI fields and/or controls may affect an underlying data model. Data model changes then reflect in a subsequently rendered runtime UI display screen. UI display screen changes may be automatically propagated to the runtime UI display screen in response to user input provided via the dialog box that results in changes to one or more computing objects accessible via the UI display screen. Data model changes may automatically result in corresponding UI display screen changes.

Hence, certain embodiments discussed herein include user friendly software and accompanying UI display screens for facilitating UI display screen customization, e.g., addition of custom fields to out-of-the-box applications. Software administrators, business users, or other personnel credentialed to modify software UIs may readily create and edit custom fields within a runtime application in the context of the page where the fields are to be displayed.

By blending or overlaying UI setup functionality with features and/or context information characterizing the UI of a runtime application, the context of the runtime UI display screen to be modified is maintained. Users are no longer required to switch between runtime and setup pages to effectuate UI display screen (and UI model) modifications.

Such blending or overlaying of UI modification features and functionality enables software administrators to readily determine which items and associated computing objects are to be modified. Administrators no longer need to search for or navigate to a particular applicable work area of a separate setup application, which was time consuming and error prone.

Accordingly, certain embodiments discussed herein facilitate UI-Driven extensibility for networked application models, e.g., enterprise application models, where data model and UI model updates propagate to various tiers in multi-tier applications, such as presentation, application, and data tiers.

A further understanding of the nature and the advantages of particular embodiments disclosed herein may be realized by reference of the remaining portions of the specification and the attached drawings.

DETAILED DESCRIPTION OF EMBODIMENTS

For the purposes of the present discussion, an enterprise computing environment may be any computing environment used for an enterprise. An enterprise may be any organization of persons, such as a business, university, government, military, and so on. The terms "organization" and "enterprise" are employed interchangeably herein.

A computing environment may be any collection of computing resources used to perform one or more tasks involving computer processing. An example enterprise computing environment includes various computing resources distributed across a network and may further include private and shared content on intranet web servers, databases, files on local hard discs or file servers, email systems, document management systems, portals, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include Financials, Assets, Procurement, Projects, Supply Chain, and so on. The terms "enterprise software," "enterprise software application," and "enterprise application" may be employed interchangeably herein.

Enterprise software applications running in enterprise computing environments often exhibit multi-tier architecture. A multi-tier application may be any application whose data and/or functionality may be grouped, where the groups are called tiers. For example, client-side software that communicates with a server-side web service to facilitate implementing software processes, e.g., data storage, retrieval, and so on, may be considered a client-server application exhibiting multi-tier architecture. The client-server application may have various tiers, such as a presentation tier (also called a user interface tier or client tier herein) for rendering UI display screens; a middle tier (e.g., an application tier or middleware tier); and a backend data tier (also called a data model tier).

For clarity, certain well-known components, such as hard drives, processors, operating systems, power supplies, routers, Internet Service Providers (ISPs), Enterprise Service Busses (ESBs), client computers, and so on, have been omitted from the figures. However, those skilled in the art with access to the present teachings will know which components to implement and how to implement them to meet the needs of a given implementation.

Figure 1:
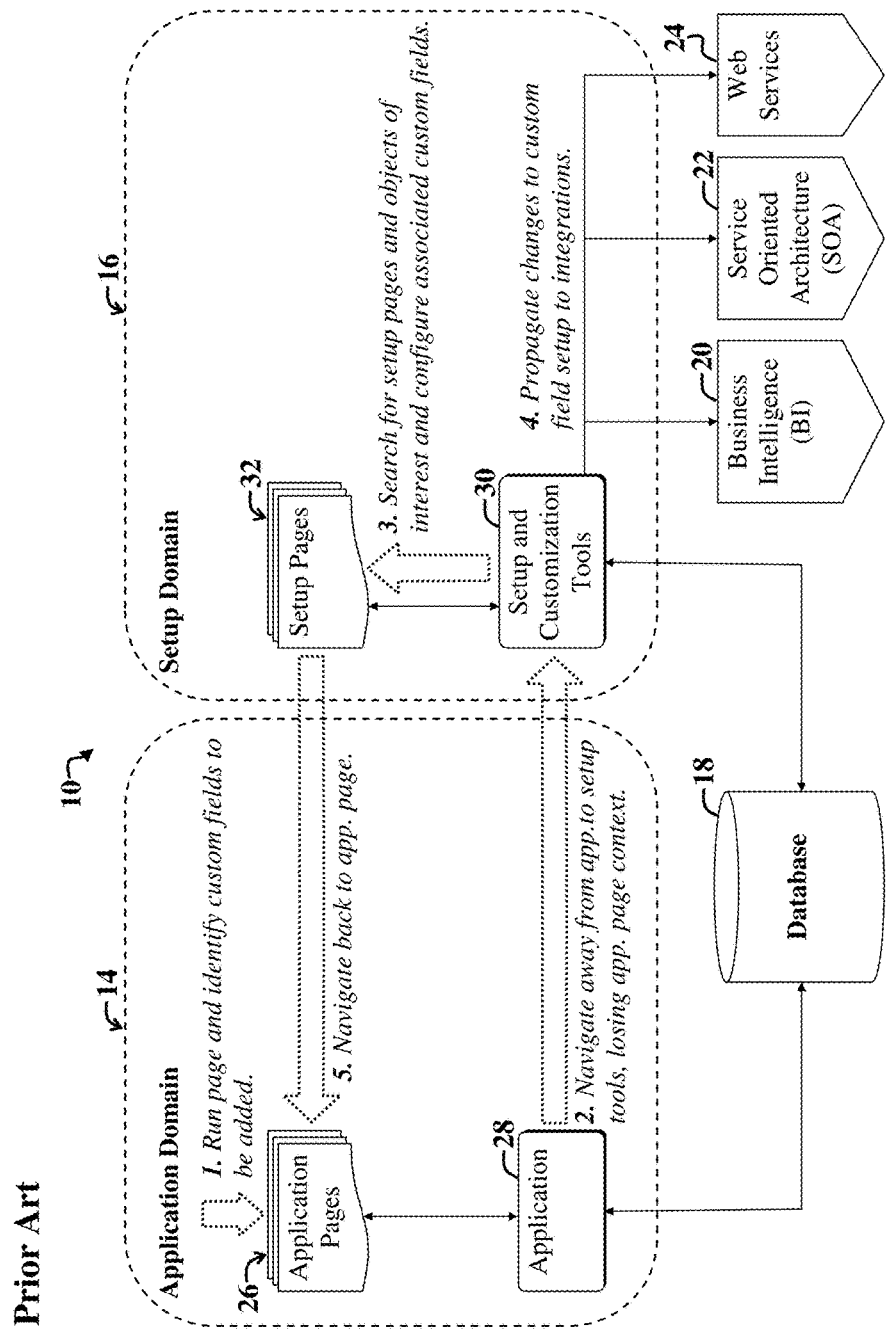
FIG. 1 is a diagram illustrating an example conventional multi-tier system and accompanying method for facilitating modifications to UI display screens.

FIG. 1 is a diagram illustrating an example conventional multi-tier system 10 and accompanying method for facilitating modifications to UI display screens 26. The following review of an example conventional system 10 is intended to facilitate an understanding of various embodiments discussed more fully below with reference to FIGS. 2-9.

For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view, window, or page. Views or windows may include sections, such as sub-views or sub-windows, dialog boxes, graphs, tables, and so on. In certain cases, a UI display screen may refer to all application windows presently displayed on a display.

The system 10 includes an application domain 14 and a setup domain 16 in communication with a database 18. The setup domain 16 is shown further interfacing with other network resources, such as web services 24, Service Oriented Architecture (SOA) components 22, business intelligence software 20, and so on. Note that in practice, the application domain 14 also interfaces with the other integrated resources 20-24. The domains 14, 16 and database 18 may be implemented via one or more servers and client computers.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. An SOA server may be any server that is adapted to facilitate providing services accessible to one or more client computers coupled to a network.

A domain may be any collection of computing resources, such as business processes. Certain domains may share a given runtime engine or collection of similarly typed runtime engines, also called runtimes. The terms "domain" and "deployment unit" may be employed interchangeably herein.

The application domain 14 includes an application 28, which communicates with the backend database 18 and generates instructions for facilitating rendering of application pages 26, which represent runtime pages. For the purposes of the present discussion, a runtime page (also called a runtime UI display screen) may be any UI display screen that is presented via a running application or an application to be run, e.g., to show UI display screen modifications. A separate UI display screen used to make adjustments to the appearance and/or functionality of another runtime UI display screen (also simply called runtime screen or runtime page) is called a setup UI display screen or setup page herein.

A setup application 30, which includes software setup and customization tools, also communicates with the backend database 18 and is adapted to produce instructions for rendering setup pages 32. The setup pages 32 may present various UI controls and features that provide tools for making changes to data models and computing objects used by the application 28 to render the application pages 26.

Some setup and customization tools 30 may facilitate developer modification of computer code of the application 28. Furthermore, the setup and customization tools 30 may include functionality for facilitating propagating information about any changes (e.g., UI model changes, computing object changes, data model changes, and so on) made via the tools 30 to other network resources, such as web services 24, SOA systems or networks 22, Business Intelligence (BI) software 20, and so on.

In operation, a user, such as an administrator or developer, modifies the application pages 26 by first running the application 28 to display the runtime application pages 26. The user then notes which features of the application pages 26 are to be modified. The user then attempts to remember context information, including what features of the application pages 26 were to be modified and how. The user may (but not necessarily) then logout or close the application 28, and then navigate to (and run) the setup and customization tools 30.

The user then employs the setup and customization tools 30 and associated setup pages 32 to locate applicable setup pages and tools; search for any computing objects employed by UI features to be modified; determine how to modify associated UI controls, and so on. However, the user may have forgotten details pertaining to features of the application pages 26 that were to be modified, as the user has lost context information of the application pages.

After the user has completed modifying computing objects and/or any associated custom fields or other UI controls, the user employs the setup and customization tools 30 to trigger deployment of the associated changes to applicable network resources, e.g., the database 18, the application 28, and other integrations 20-24.

To view results of customization of the application pages 26, the user may close or otherwise navigate away from the setup and customization tools 30; then navigate back to the application 28; run it; log in; and trigger display of the resulting updated application pages 26. If any additional changes are required, or mistakes were made, the process may repeat.

Hence, use of the conventional system 10 to modify the application pages 26, e.g., by adding or customizing fields or other UI controls and/or functionality, demands potentially time consuming and error prone user interaction with software applications 28, 30 in two domains 14. 16.

Figure 2:
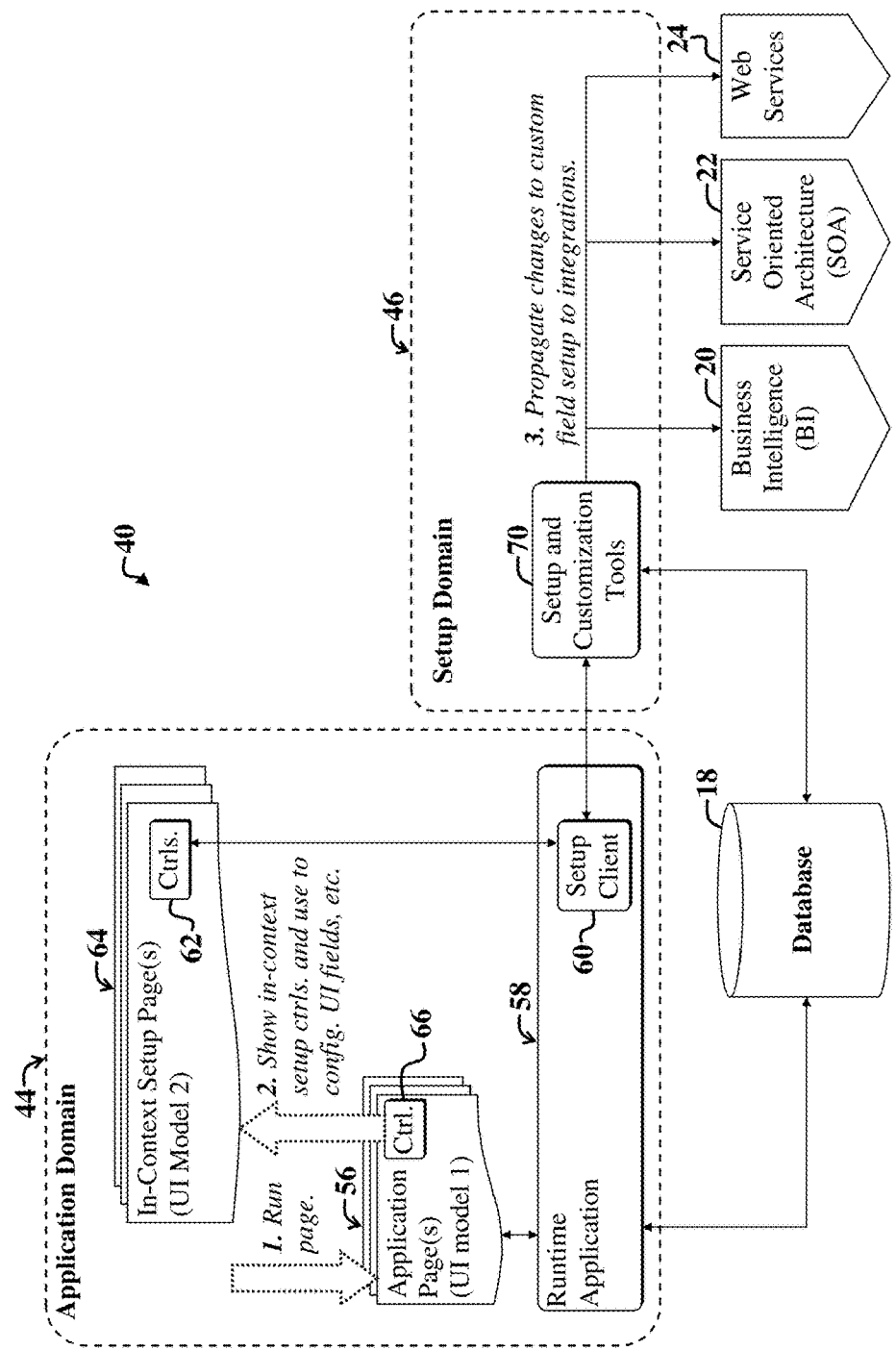
FIG. 2 is a diagram illustrating a first example embodiment of a multi-tier system adapted for use with UI and data model extensibility mechanisms discussed herein.

FIG. 2 is a diagram illustrating a first example embodiment of a multi-tier system 40 adapted for use with UI model and data model extensibility mechanisms discussed herein. The example system 40 includes an application domain 44 and a setup domain 46, which communicate with the backend database 18. The system 40 is adapted to enable user modification of runtime pages 56 in the context of the runtime pages 56, without requiring that users navigate to and use separate setup customization software, as discussed more fully below.

An updated runtime application 58 in the application domain 44 has been updated with computer code, e.g., a setup client 60. The setup client 60 is adapted to communicate with setup and customization tools 70 and to selectively use functionality provided thereby in response to user input provided via one or more UI controls 62 presented via one or more in-context setup pages 64 (also called configuration mode UI display screens herein). The setup client 60 may include computer code for calling functions of the setup and customization tools 70, and for overlaying or blending setup tools and associated UI controls 62 over or with a representation 64 of the application page(s) 56.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

A UI feature may be any aspect characterizing or describing a UI, including visual characteristics, elements, UI controls, UI model, and/or associated data, functionality, and behavior. A customizable UI feature may be any UI feature, e.g., UI control, region, field, and so on, that is responsive to user interaction therewith (or with one or more associated UI controls) to effect a change in the UI feature, such as change in appearance, and or content of the UI feature.

A UI model may be any architecture or framework or set of rules or guidelines employed to render a UI display screen or portion thereof. A UI model may, for example, specify a method and/or organization (e.g., organization of user interface controls and associated functionality) for enabling or facilitating user interaction with a software application. A UI modification may be any change to a UI model or other UI feature.

The application pages 56 have been updated with a UI control 66, such as a hyperlink, for triggering display of the in-context setup pages 64. Note that in certain implementations, the in-context setup pages 64 represent versions of the application pages 66, which have been updated to show UI controls 62 for customizing the application pages and associated UI model. In other implementations, the controls 62 are added directly to the application pages 56, e.g., via one or more UI layers, in response to user selection of the application page UI control 66.

Note that whether the in-context setup pages 64 represent UI display screens that are visually separated from the application pages 56 or represent the same pages 56 but augmented with one or more UI controls, is implementation specific and may vary, without departing from the scope of the present teachings.

Those skilled in the art with access to the present teachings may readily determine and implement, without undue experimentation, a UI display screen launched in response to user selection of the control 66 that preserves context information from the application pages 56; runs in the application domain; and facilitates user access to UI setup and/or customization tools.

For the purposes of the present discussion, UI context information may be any information characterizing, describing, or otherwise associated with a UI display screen. For example, a given UI display screen may present various UI elements, e.g., fields, dialog boxes, UI controls, and so on, which may be associated with functionality for manipulating, accessing, etc., data and/or functionality contained via or associated with a given computing object. Hence, context information may include information about data and computing objects accessed by UI features, specifications of UI architectures or models, descriptions of UI functionality, and so on.

A computing object may be any collection of data and/or functionality. Examples of computing objects include a note, appointment, a particular interaction, a task computing object, a customer or employee object, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object includes software functions or processes for issuing a reminder for an appointment.

Accordingly, object context information may be any information indicating a subject matter characterizing data maintained via the object. For example, in a UI display screen showing address information, the address information may represent object context information characterizing an address computing object.

In operation, a user, such as an administrator, business user, or other person credentialed to modify application pages, runs or otherwise causes the runtime application 58 to render the application pages 56. The user then views the application pages 56, which may be presented in accordance with a first UI model, and determines whether certain UI modifications are to be made.

If one or more modifications are to be made to the application pages 56, the user selects a control 66, which may act as a mode-change UI control to switch the mode of the runtime application 58 from a default or working mode to a setup mode. The runtime application 58 detects user selection of the control 66, which then triggers activation of the setup client 60.

The setup client 60 preserves context information from the application pages 56, effectively augmenting data and features of the application pages 56 with one or more setup UI controls 62 and presenting the resulting in-context setup pages 64. The setup controls 62 may be overlaid on or otherwise made user accessible via the in-context setup pages 64.

The in-context setup pages 64 may be presented via a UI model (e.g., UI model 2) that is similar to the UI model (e.g., UI model 1) used to present the application pages 56 and which preserves context information, such as customizable field page location, subject matter pertaining to the customizable fields, and so on. Note that in certain implementations, the in-context setup pages 64 are presented via separate pages or windows from the application pages 56. In other implementations, the in-context setup pages 64 replace the application pages 56 upon user selection of the mode control 66 or otherwise overlay setup UI controls on the application pages 56.

After display of the in-context setup pages 64, the user may manipulate the in-context setup pages 64 via the setup controls 62, which may include dialog boxes, buttons, links, menu items, drop-down controls, radio buttons, check boxes, and so on. Setup functionality associated with the setup controls 62 is handled by the setup client 60. The setup client 60 may call software functions or processes of the setup and customization tools 70 to implement instructions derived from user interaction with the setup controls 62.

For example, if a user employs the controls 62 to insert a custom field in the in-context setup pages 64 and subsequent application pages 56, the setup client 60 may interface with the setup and customization tools 70 to leverage functionality thereof for inserting a custom field in the application pages 56. The setup client 60 may employ context information from the in-context setup pages 64 and application pages 56 and functions of the setup and customization tools 70 to automatically determine what computing objects are applicable or should be associated with the custom field; what, if any, data model changes should be made; how various computing resources, including downstream computing resources (e.g., resources 20-24) should or should not be updated or integrated based on the change, and so on. The setup client 60 and setup and customization tools 70 then automatically implement appropriate changes (e.g., to data models, resource integrations, and so on) based on the determinations.

The term "resource" as used herein, may generally refer to one or more components or aspects of or in a computing environment. Accordingly, a network resource may be any network entity or characteristic or associated identifier. Examples of network entities include software (e.g., web services, enterprise applications, etc.), including software systems and accompanying infrastructure, computers, switches, interfaces, batteries, networks, and so on. Examples of characteristics or identifiers include communications link bandwidth, power consumption, router processor speed, network services, and so on.

Hence, the in-context setup pages 64 and accompanying setup controls 62 facilitate user configuration of application pages 56 in the context of the application pages 56, via the in-context setup pages 64. The setup client 60 and setup and customization tools 70 further facilitate flowing or propagating any changes downstream to any necessary integration points 20-24 to facilitate consistent interactions between other resources 20-24, the runtime application 58, and the database 18.

For example, in certain implementations, the runtime application 58 is an integrated application that may communicate with BI 20, other SOA servers and networks 22, web services 24, the database 18, and so on. If changes made to the application pages 56 and underlying data model and accompanying UI model (model 1) will affect such communication, then the setup and customization tools 70 make requisite adjustments to interfacing code or middleware to ensure seamless integration between the runtime application 58 and applications communicating therewith.

The runtime application 58 may be, for example, an enterprise employee performance management application that employs data objects arranged via the backend database 18 in accordance with a data model to present application pages 56 in accordance with a UI model that depends in part on the data model of the database 18.

Note that in certain implementations, the runtime application 58 (and any accompanying Graphical User Interface (GUI) modules used thereby) may employ an intermediate data model to generate an application page in accordance with a UI model. The intermediate data model may be based on a data model used to organize data via the database 18.

In the present example embodiment, the setup and customization tools 70 includes computer code for making adjustments to a data model employed by the database 18 and used to generate the application pages 56, and for making corresponding adjustments to the UI model and associated application pages 56. The adjustments are made in accordance with user input provided via the setup controls 62 of the in-context setup pages 64.

Note that depending upon the needs of a given implementation, different modules and domains of the system 40 may be distributed across a network or may be implemented on a single computer, without departing from the scope of the present teachings. For example, the setup and customization tools 70 may be implemented as middleware running on a server; the application pages 56 and in-context setup pages 64 may be rendered on a client device via a browser; the runtime application 58 may be implemented server side or client side, and so on.

For the purposes of the present discussion, middleware may be any computer code that facilitates interfacing software and/or accompanying devices, thereby facilitating communications therebetween. Certain middleware may facilitate client-server communications, operating system-application communications, and so on.

The system 40 (and accompanying integrated applications 58, 70, 18) may be considered a multi-tier or multi-layer system, where the application pages 56, 64 may represent a presentation tier or layer; the setup and customization tools 70 may represent a middle tier or layer, and the database 18 and accompanying database software and data model may represent a backend data tier or layer.

In the present example embodiment, the computing environment of the system 40 represents a networked computing environment. For the purposes of the present discussion, a networked computing environment may be any computing environment that includes intercommunicating computers, i.e., a computer network. Similarly, a networked software application may be computer code that is adapted to facilitate communicating with or otherwise using one or more computing resources, e.g., servers, via a network.

In summary, the in-context setup pages 64 may represent runtime pages with exposed setup controls 62, such as UI controls for adding or editing UI features or controls in the application pages 56. The setup UI configuration can be done in the context of the running application page(s) 56. Users need not leave the application pages 56 or context thereof or navigate to a separate work area. Users need not search for the UI and/or data model object to add fields to, as the system 40 may introspect itself, i.e., reference application page context information, to automatically determine the appropriate data model object based upon where and/or how the user launched a particular action on the in-context setup pages 64.

The setup or configuration process not only updates the underlying data model or layer with custom fields, but also updates the UI model or layer with custom fields. Information about such updates may flow to downstream integration points for integrating or updating web services 24, business intelligence 20, and so on.

Note that the UI display screen modification process enabled via the example system 40 involves user interaction with applications running in the application domain 44 and does not require users to leave the application domain 44; navigate to the setup domain 46; interact with setup pages running in the setup domain 46, and so on.

Figure 3:
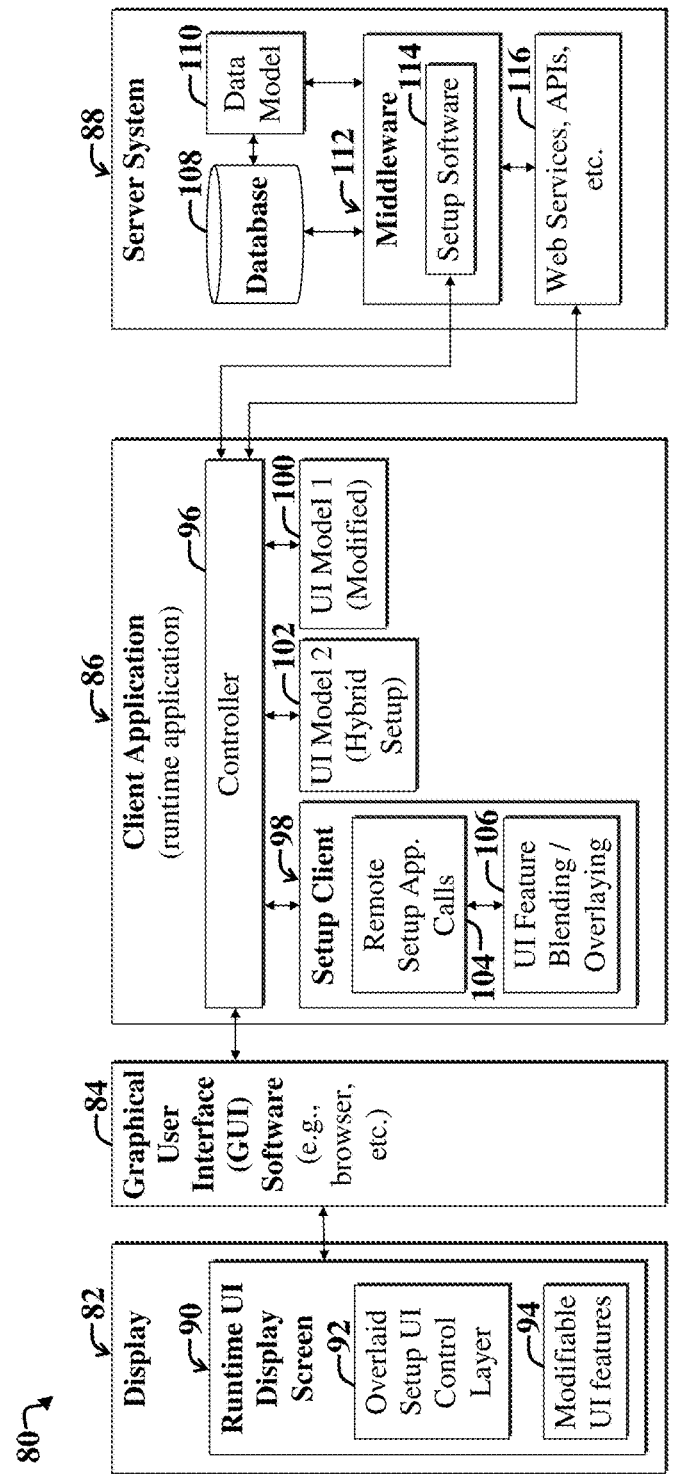
FIG. 3 is a diagram illustrating a second example embodiment of a multi-tier system adapted to facilitate modification of one or more UI features of a runtime application.

FIG. 3 is a diagram illustrating a second example embodiment of a multi-tier system 80 adapted to facilitate modification of one or more UI features 94 of a runtime application 86. The multi-tier system 80 includes a client application 86 in communication with a server system 88, e.g., via a network, such as the Internet.

The client application 86 may run on a computer system, such as a desktop computer, mobile device (e.g., tablet, smartphone, etc.), which includes Graphical User Interface (GUI) software 84 for facilitating rendering UI display screens 90 of the client application 86 via a display 82. Alternatively, the client system 86 (or one or more modules thereof) may be implemented server-side, e.g., on a server of the server system 88. The server system 88 may include one or more servers.

The runtime UI display screen 90 and associated GUI software 84 may be considered part of a presentation tier. The client application 86 and middleware 112 of the server system 88 may be considered part of an application tier or middle tier. A backend server-side database 108 and accompanying data model 110 may represent a data tier or backend tier. Note that such tier grouping may vary depending upon the needs of a given implementation and system specification.

In the present example embodiment, the display 82 shows the runtime UI display screen, i.e., page 90, when the associated client application 86 is in setup mode. The runtime page 90 includes an overlaid setup UI control layer 92, which includes setup UI controls for facilitating user modification of modifiable UI features 94. The setup UI controls of the setup UI control layer 92 may enable user access to various customization tools, as discussed more fully below, whereby a user can direct changes at both the presentation tier (e.g., changes to the UI models 100, 102 and associated runtime UI display screen 90) and the data tier (e.g., changes to computing objects in the database 108 and changes to the data model 110). Fields and/or data added to a data model result in refreshment of the associated UI model upon saving and deploying changes and reauthenticating via the client application 86.

After changes are saved and deployed, the setup mode may be exited (e.g., in response to user selection of an exit control or mode-change control in the Runtime UI display screen 90). The user may then reauthenticate the client application 86, after which the runtime page 90 may revert to a state whereby the overlaid setup control UI layer 92 is removed. The resulting display screen will show any pre-existing UI features and any added or customized UI features.

The GUI software 84 includes computer code for facilitating translating a UI display screen description from the client application 86 into rendering instructions suitable for display via the display 82.

The client application 86 includes a controller 96 in communication with various modules 98-102, including a setup client 98, a first UI model 100, and a second UI model 102. The controller 96 includes computer code that is adapted to interface various modules 98-102, including the GUI module 84 and middleware 112 and web services 116 of the server system 88, thereby facilitating communications therebetween.

The server system 88 includes middleware 112 interfacing a backend database 108 and accompanying data model 110 with other network computing resources, such as web services and APIs 116 and the client application 86. The middleware 112 includes setup software 114, which communicates with the client application 86, e.g., via the controller 96 and any intervening network, such as the Internet. Similarly, the web services and APIs 116 may communicate with the client application 86 via the client controller 96 and any intervening network.

The setup client 98 of the client application 86 includes remote setup application calls 104 for calling remote setup software 114 of the server-side middleware 112. A UI blending module 106 includes computer code for determining which setup UI controls to include in the setup UI control layer 92 of the runtime UI display screen 90.

Alternatively, in certain implementations, the UI blending module 106 includes code for rendering a separate UI display screen as opposed to the setup UI control layer 92. However, the separate UI display screen will maintain context information (e.g., displayed modifiable UI features 94) available in a UI display screen from which the setup client 98 and accompanying UI feature blending module 106 was activated.

The first UI model 100 may represent the UI model used by the client application 86 during a first operational mode. The first mode may correspond to a default or normal working mode, whereby the user can interact with UI controls, including modifiable UI features 94 of the client application 86.

The second UI model 102 may represent the UI model used by the client application 86 during setup mode, whereby setup UI controls are presented via a setup UI control layer 92, and/or via a separately generated UI display screen based on the second UI model 102.

The first UI model 100 and the second UI model 102 may be substantially similar, with certain exceptions, including that the second UI model 102 includes specifications of setup UI controls for enabling user access to setup functionality afforded by the server-side setup software 114 of the server system 88.

Note that the various UI models 100, 102 may change based on user changes initiated via the setup UI control layer 92. User changes to the UI display screen 90 may result in changes to the data model 110 characterizing an arrangement of data stored in the database 108. Changes to the data model 110 may then back propagate to the client application controller 96, which may adjust the UI models 100, 102 to be consistent with any changes to the data model 110.

The client application 86 may employ network resources, such as networked software applications or processes accessible via web services and APIs 116. Some web services, APIs, etc., may require adjustments based on user-initiated adjustments to the runtime UI display screen 90 and associated UI architecture, i.e., models 100, 102. The middleware 112 and accompanying setup software 114 of the server system 88 include computer code for automatically determining and propagating requisite changes to the web services and APIs 116 and to any other requisite integration points, as needed to integrate software functionality.

Hence, the client application 86 may call web services, APIs, and so on, to facilitate access to other data and functionality provided by other network resources (e.g., enterprise software applications) by the client application 86. For the purposes of the present discussion, a networked software application may be any software application or computer code adapted to use data and/or functionality provided via one or more resources, e.g., data, memory, software functionality, etc., accessible to the software application via a network. Accordingly, the client application 86 may represent a networked software application.

Accordingly, the system 80 facilitates efficient in-context user modification of modifiable UI features 94, where the changes may readily propagate through and update multiple tiers of a multi-tier or networked software application. The system 80 allows for UI-Driven extensibility for the enterprise application model, where the system 80 updates all tiers in multi-tier applications, including UI, web service, business intelligence, and import/export occurrences, in both single and cluster-based applications.

The system 80 facilitates user friendly and efficient addition of custom fields to a runtime application, e.g., the client application 86, without navigating away from the runtime page 90; without needing to search for an appropriate model object to associate with a field; without needing to switch between runtime and setup pages to determine where a field will be added in the runtime page based on setup pages, and so on.

Figure 4:
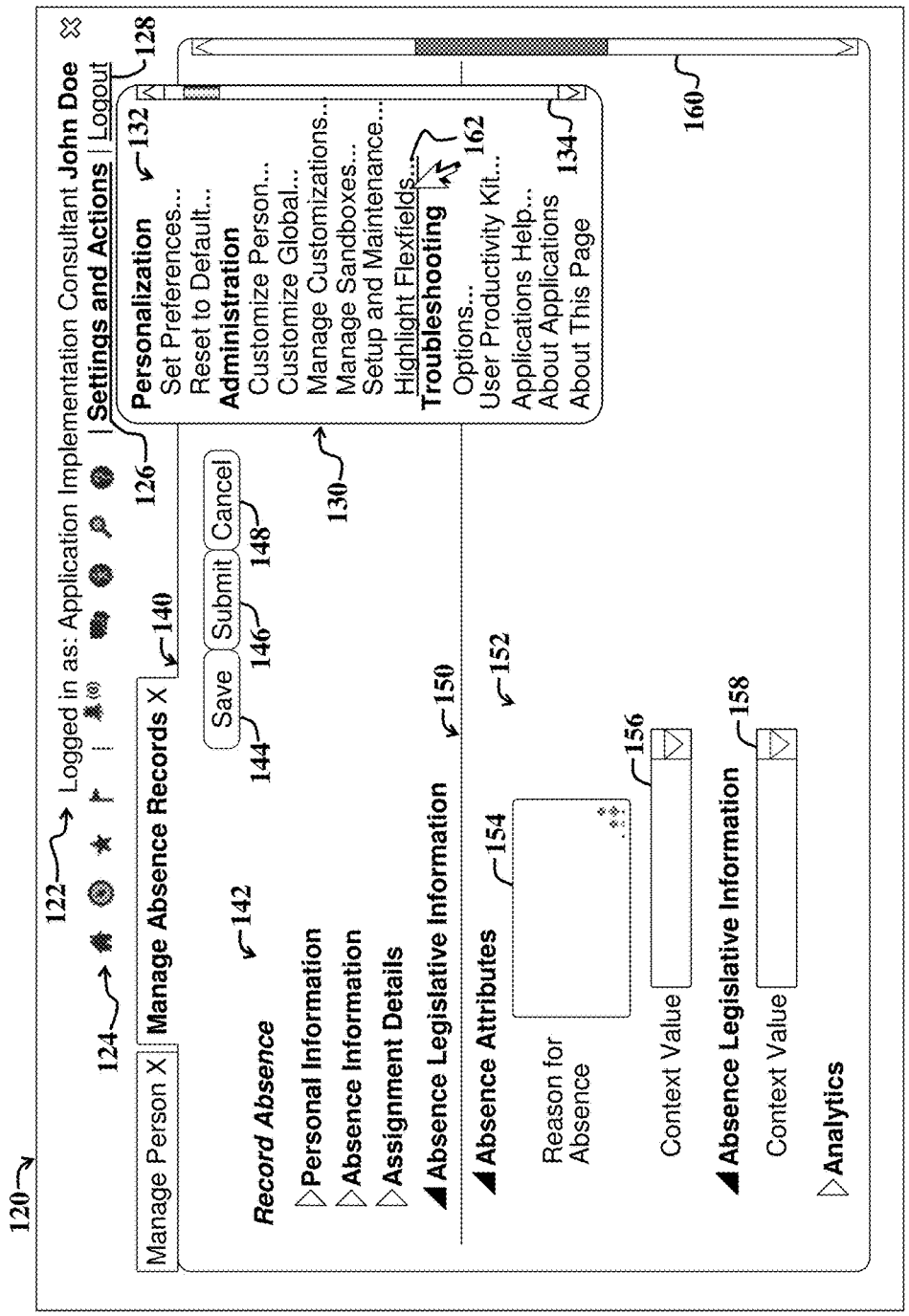
FIG. 4 illustrates a first example UI display screen, which may be produced via the systems of FIG. 2 or 3, and which illustrates a UI control for facilitating entering a UI setup or configuration mode.

FIG. 4 illustrates a first example UI display screen 120, i.e., page, which may be produced via the systems of FIG. 2 or 3, and which illustrates a UI control 162 (labeled Highlight Flexfields) for facilitating distinguishing user modifiable fields.

With reference to FIGS. 2 and 4, the UI display screen 120 represents an example of the application page(s) 56 of FIG. 2. The highlight flexfields UI control 162 in FIG. 4 represents an example of the control 66 of FIG. 2. The UI display screen 120 may represent a page presented via a networked enterprise application, such as an employee performance management application.

For the purposes of the present discussion, a flexfield may be any placeholder or other mechanism identifying a location and/or region where a field or element may be modified or added. Flexfields may identify where (in a UI display screen) a field or other UI feature that can be customized or otherwise modified or added to the UI display screen. The field or other UI feature whose position is held by a flexfield may also be called a flexfield.

The example UI display screen 120 includes a status bar indicating that a user (consultant John Doe) is logged in to an underlying application analogous to the runtime application 58 of FIG. 2 and used to produce the UI display screen 120.

Below the status bar 122, a control bar 124 includes various UI controls, including a settings and actions link or button 126 and a logout link or button 128. User selection of the settings and actions control 126 triggers display of a settings and action drop-down menu 130. The settings and actions menu 130 includes various UI controls 132 representing user options to adjust software settings and actions. The drop-down menu 130 includes a scrollbar 134 for facilitating display of additional or different UI controls 132, which represent menu items or elements.

The menu items 132 include the highlight flexfields control 162, which is exposed in the drop-down menu 130 when the logged in user (e.g., John Doe) is credentialed to make modifications to the UI display screen 120 and/or to underlying UI architecture and/or to data models and computing objects. User selection of the highlight flexfields control 162 triggers display of additional UI controls (representative of the setup UI controls 62 of the in-context setup pages 64 of FIG. 2) and indicators for facilitating modification of the UI display screen 120, as discussed more fully below.

The example UI display screen 120 includes various features, including a manage absence records tab 140 showing a record absence section 142 and various expandable subsections, including an absence legislative information section 150. The example absence legislative information section 150 includes various UI controls or fields 152, which are positioned in various subsections of the absence legislative information subsection 150.

The example manage absence records tab 140 further includes various UI controls 144-148, including a save button 144, a submit button 146, and a cancel button 148, for facilitating saving a state of a UI display screen; for submitting information in the UI display screen (e.g., to another application, web service, cloud storage, etc.), and for canceling user selections or input data, respectively.

In operation, a user runs or otherwise brings into focus the underlying software application used to generate the UI display screen 120, and then decides whether any UI display screen features 142-158 warrant possible modification.

In an example scenario, the user employs a scrollbar 160 of the manage absence records tab 140 to scroll to the absence legislative information section 150. The user then decides that one or more UI features 152 of the absence legislative information section 150 may need modification.

Accordingly, the user then selects the settings and actions control 126 to display the associated drop-down menu 130, and then selects the highlight flexfields option 162 from the list of UI controls 132. User selection of the highlight flexfields option 162 triggers transitioning of the UI display screen 120 to the second UI display screen 170 of FIG. 5.

Figure 5:
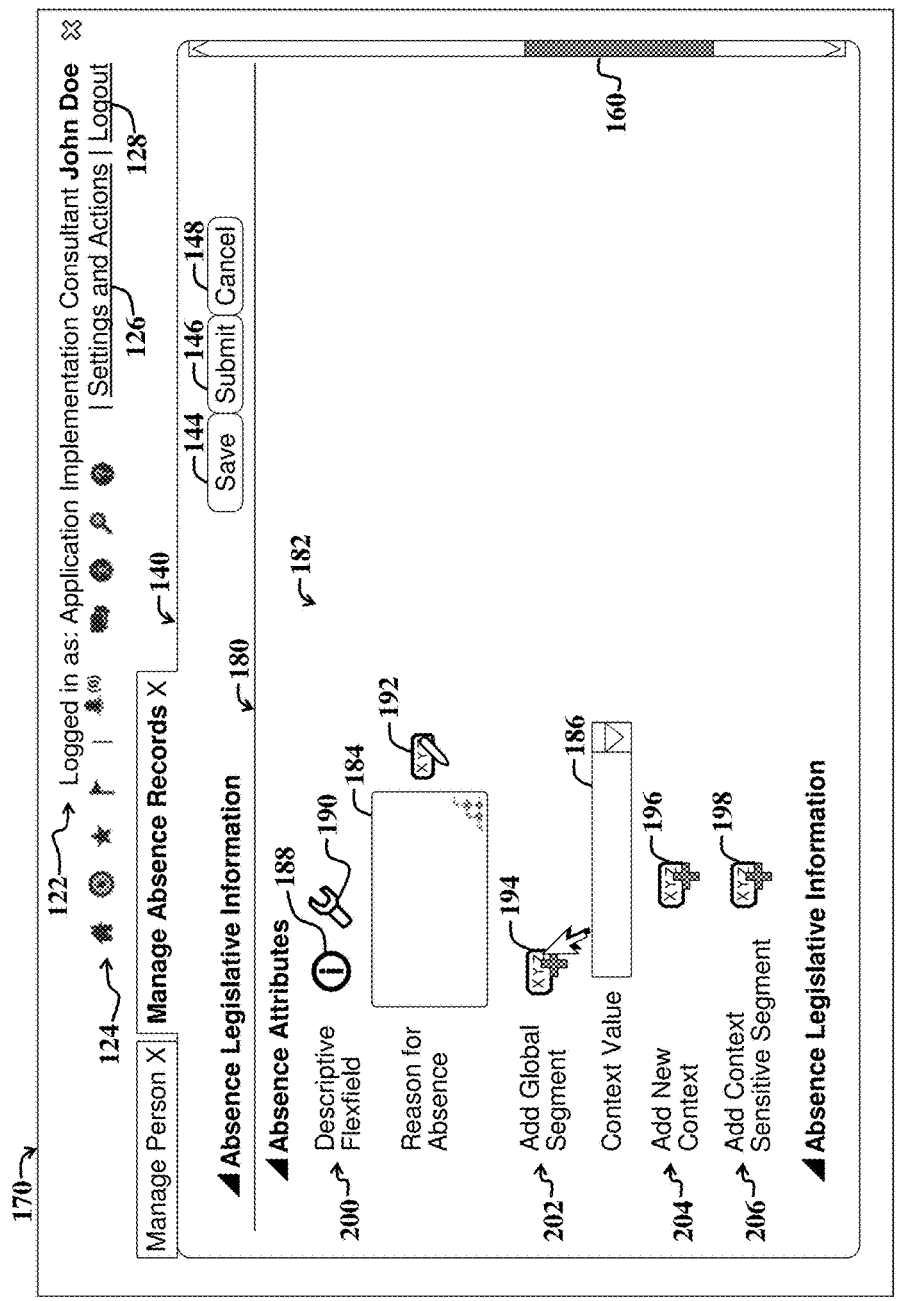
FIG. 5 illustrates s second example UI display screen showing user modifiable fields and features of the UI display screen of FIG. 4 and providing UI controls for facilitating modification of the modifiable fields and features.

The second UI display screen of FIG. 5 is representative of the in-context setup pages 64 of FIG. 2 and the runtime UI display screen 90 of FIG. 3.

The highlight flexfield control 162 represents a user option to facilitate identifying, e.g., via highlighting and/or other visual indicators, where in the UI display screen 120 custom fields can be modified or added, along with any additional user configuration options, as discussed more fully below. Users no longer need to leave the context of the UI display screen 120 to perform UI modifications.

FIG. 5 illustrates s second example UI display screen 170 showing user modifiable fields and features 182 corresponding to the UI display screen 120 of FIG. 4 and providing UI controls 188-198 for facilitating modification of the modifiable fields and features 182.

With reference to FIGS. 4 and 5, note that the second example UI display screen 170 of FIG. 5 maintains context information from the original UI display screen 120 of FIG. 4. For example, a manage absence records tab 140 of FIG. 5 corresponds to the similar tab 140 of FIG. 4. An absence legislative information section 180 of the UI display screen 170 corresponds to the absence legislative information section 150 of FIG. 4. Similarly, the reason for absence field 184 and the context value control 186 of FIG. 5 correspond to the reason for absence field 154 and the context value control 156 of FIG. 4, respectively. Accordingly, context information, including information about existing fields or sections in the original UI display screen 120 (including position information) of FIG. 4 is carried over to the in-context setup screen 170 of FIG. 5.

A difference between the UI display screens 120 of FIG. 4 and 170 of FIG. 5 is that FIG. 5 shows the various UI controls 188, 190, 192, 194, 196, 198 adjacent to or in proximity to modifiable fields or controls (e.g., fields or controls 184, and 186), including fields or controls, i.e., UI features 200-206, which may be added to the absence legislative information section 150 of the first UI display screen 120 of FIG. 4. Note that the UI controls UI controls 188, 190, 192, 194, 196, 198 are representative of the UI controls 62 of FIG. 2 and/or controls of the UI control layer 92 of FIG. 3.

The UI controls 188, 190, 192, 194, 196, 198 not only provide user options for editing or customizing the UI display screen 170 and underlying UI model used to generate the UI display screen 120 of FIG. 4, but act as indicators identifying screen locations or regions where custom fields and other UI features may be added or edited.

The example setup UI controls 188, 190, 192, 194, 196, 198 include an information icon 188, a configuration icon 190 (also called the wrench icon), an edit icon 192, and create icons 194-198. User selection of the information icon 188 may trigger display of an information window with descriptive information pertaining to a descriptive flexfield that may be configured for the absence legislative information sections 150, 180 of FIGS. 4 and 5, respectively.

Similarly, user selection of the wrench icon 190 may trigger display of a dialog box (also simply called dialog herein) or window with additional user options (e.g., advanced configuration options) for configuring a descriptive flexfield 200, which may be added to the UI display screens 150, 180 and accompanying underlying UI model(s). For the purposes of the present discussion, a dialog box may be any computer-generated graphical representation that includes one or more displayed mechanisms that are responsive to user input.

User selection of an edit icon, such as the edit icon 192, may trigger display of a dialog box with various UI controls and associated user options for editing characteristics or properties of the associated customizable field, e.g., the reason for absence field 184. An example edit dialog box is discussed more fully below with reference to FIG. 8.

Similarly, user selection of a create icon, such as the create icon 194, may trigger display of a dialog box with one or more UI controls for facilitating adding a field or feature, such as a global segment, to the UI display screens 120, 170 of FIGS. 4 and 5. An example create dialog box is discussed more fully below with reference to FIG. 6.

In operation, with reference to FIGS. 4 and 5, a user selects the highlight flexfields option 162 from the drop-down menu 130 of FIG. 4, which triggers display of the UI display screen 170, which identifies where custom fields can be added and/or customized. Additional information about each customizable field may be made available via an information icon, such as the information icon 188.

The in-context setup display screen 170 provides user access to setup and customization tools without requiring that users leave the original page (e.g., page 120 of FIG. 4) or otherwise without requiring users to leave the context of the original page. Setup controls for adding new custom fields (e.g., controls 194-198); for editing existing custom fields (e.g., control 192), and for accessing advanced configuration options (e.g., control 190) are provided.

The various setup controls 188-198 represent inline tools. For the purposes of the present discussion, an inline UI control may be any UI control, such as a tool, that is provided in proximity to or in alignment with a field or feature (of a UI display screen) associated with the UI control, e.g., that is modifiable via use of the UI control.

Note that the example customizable UI features 184, 186 are merely examples and may vary, without departing from the scope of the present teachings. For example, certain implementations may provide for configurable regions with configurable sub-regions and any accompanying configurable controls within the regions. Such customizable regions are enabled by the systems of FIGS. 2 and 3.

In summary, the in-context setup UI display screen 170 may represent an example UI page of a setup mode of an underlying software application, which facilitates editing flexfields or other readily configurable or customizable UI display screen features. The UI display screen 170 may represent a re-rendering of the UI display screen 120, whereby custom fields or other editable or configurable UI features exist and/or may be added. This obviates the need for a user to leave the context of an application page to perform page customizations.

Figure 6:
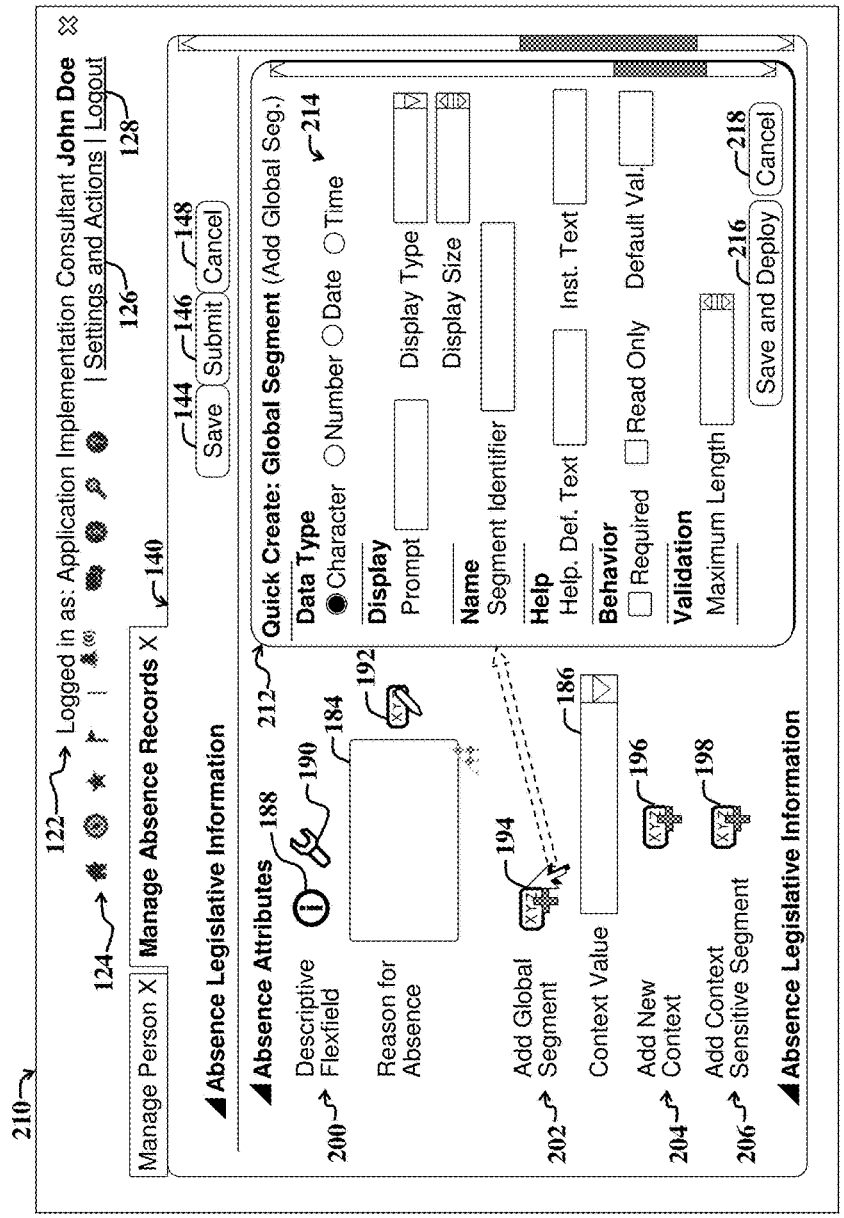
FIG. 6 illustrates a third example UI display screen showing an example dialog box for facilitating adding a custom field to the UI display screens of FIGS. 4 and 5.

FIG. 6 illustrates a third example UI display screen 210 showing an example dialog box 212 for facilitating adding a custom field (e.g., global segment 202) to the UI display screens 120, 210 of FIGS. 4 and 6. The third UI display screen 210 is similar to the second UI display screen 170 of FIG. 5 with the exception that in FIG. 6, a user has selected the create icon 194 of a corresponding global segment UI feature 202, triggering display of the create dialog box 212.

For the purposes of the present discussion, a custom field may be any field or region that has been added to a UI display screen by a system, such as the systems 40, 80 of FIGS. 2 and 3, respectively, which may be customized before and/or after it is added to the UI display screen. A custom field may be considered a type of customizable field. A customizable field may be any modifiable and/or addable field. A field may be any UI control or identifiable region of a UI display screen, which may display data and/or receive input data or otherwise be adjusted to do so.

The example create dialog box 212 includes various UI controls 214, which provide various user options for configuring or editing a global segment field to be added to the UI display screen 120 of FIG. 4. For example, user options for specifying a data type, display type, segment identifier, help text, behavior, and validation lengths are provided.

After a user has manipulated the UI controls 214 in the create dialog box 212 and wishes to implement any changes, the user may select a save and deploy button 216. Alternatively, the user may cancel any changes by selecting a cancel button 218.

User selection of the save and deploy button 216 of the create dialog box 212 activates underlying software to both save any changes, including any changes to underlying computing objects, data models, and UI models. The saved changes are then deployed in a network, such as via the setup and customization tools 70 of FIG. 2 or via the middleware 112 and accompanying setup software 114 of FIG. 3. The deployment process may include updating any data objects and models, and then refreshing any applicable UI models, and propagating any changes to downstream network resources or other integrated resources, such as web services.

In summary, the create dialog box 212 (also called an add segment dialog box) facilitates user input of field details, and the save and deploy button 216 facilitates updating the underlying application with a new field. This obviates the need for users to navigate to separate setup and maintenance work areas and further obviates the need for users to search for objects, flexfields, and/or setup tasks in a maintenance work area.

Figure 7:
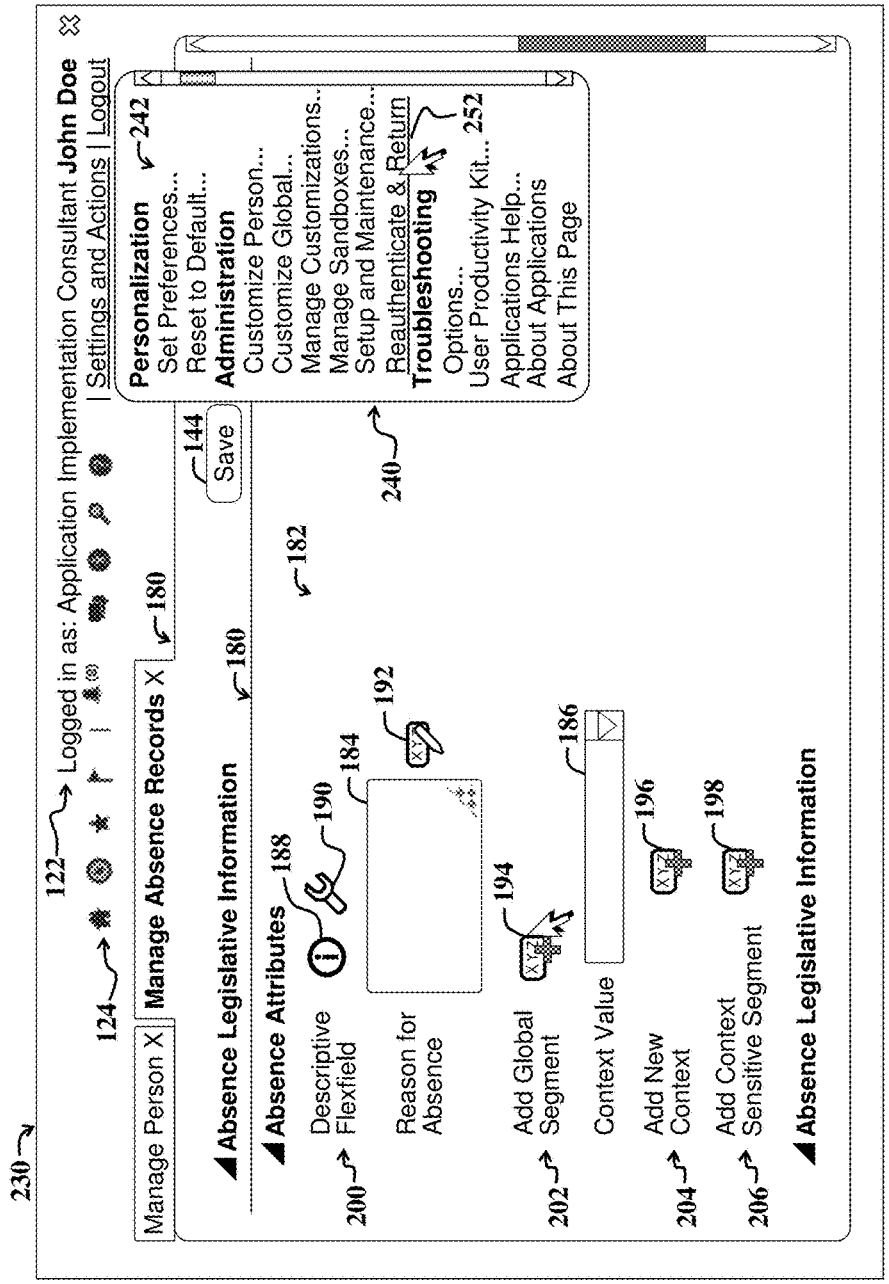
FIG. 7 illustrates a fourth example UI display screen showing an example mechanism for reauthenticating underlying software to effect changes made to the associated UI display screen of FIG. 4 via the UI display screens of FIGS. 5 and 6.

FIG. 7 illustrates a fourth example UI display screen 230 showing a mechanism 252 for facilitating reauthenticating underlying software to effect changes made to the associated UI display screen 120 of FIG. 4 via the UI display screens 170, 210 of FIGS. 5 and 6. The fourth UI display screen 230 of FIG. 7 is similar to the second UI display screen 170 of FIG. 5 with the exception of a settings drop-down menu 240 appearing in FIG. 7.

After a user has selected the save and deploy button 216 of the create dialog box 212 of FIG. 6, the settings and actions menu 240 may be updated with a user option 252 to reauthenticate the user and return the UI display screen 230 to a modified version of the original UI display screen 120 of FIG. 4. The modified version will have been modified in accordance with the user initiated changes, e.g., as made through manipulation of the create dialog box 212 of FIG. 6.

User selection of the reauthenticate and return option 252 may trigger display of an additional dialog box, with additional UI controls, e.g., fields, whereby a user may provide login credentials, and so on, as needed to log into or otherwise access functionality of the underlying software application.

Note that the reauthenticate and return option 252 is merely an example control for facilitating reauthentication of the underlying software. Other mechanisms and/or controls, such as buttons, user input sequences or hot-key combinations, and so on, may be employed, without departing from the scope of the present teachings. For example, in certain implementations, dialog boxes for facilitating reauthentication of the user may automatically appear after user selection of the save and deploy button 216 of FIG. 6.

Figure 8:
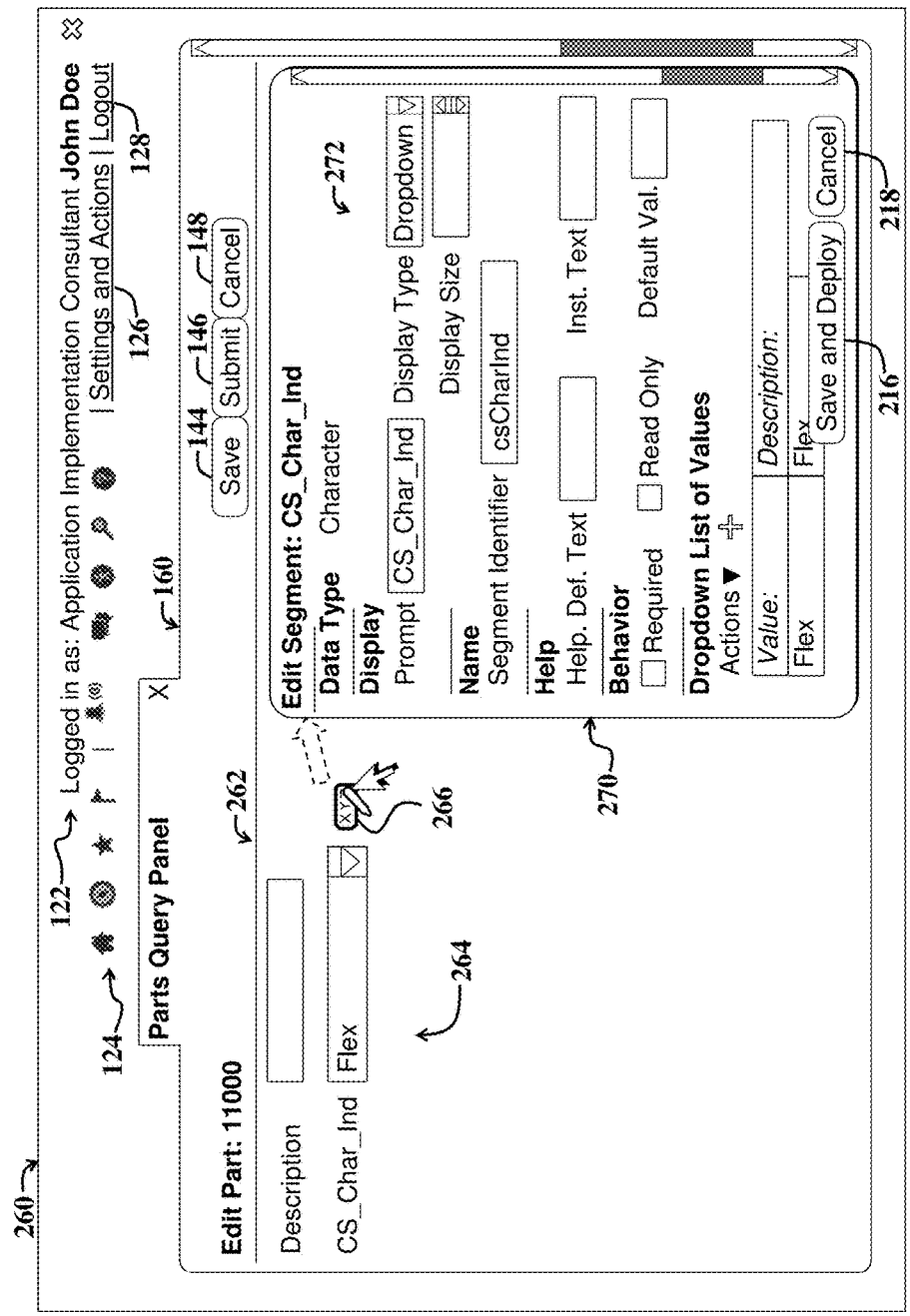
FIG. 8 illustrates a fifth example UI display screen showing an example edit-segment dialog box, which may be displayed in response to user selection of an associated edit-segment UI control.

FIG. 8 illustrates a fifth example UI display screen 260 showing an example edit-segment dialog box 270 (also simply called an edit dialog box), which may be displayed in response to user selection of an associated advanced-configuration UI control 266 (also called an edit control).

The fifth example UI display screen 260 illustrates a parts query panel or tab 160. The panel 160 includes a part section 262, which includes various UI features 264, e.g., UI controls 264, including a CS_Char_Ind flex field associated with the inline advanced-configuration UI control 266.

The advanced configuration dialog box 270 includes various UI controls 272 that provide user options for specifying control display type, name, help information, behavior, drop-down list values and descriptions, and so on. The edit-segment dialog box 270 and an advanced configuration dialog box (accessible via user selection of the wrench icon 190) may be particularly useful for ongoing data maintenance operations.

Accordingly, the embodiments of FIGS. 2-8 illustrate a system (and accompanying methods and UI mechanisms) for providing a customizable runtime UI in networked enterprise applications that propagates changes between a UI tier or layer to the data tier or layer (also called a data model tier or layer), and/or vice versa. Certain embodiments provide a runtime UI that enables customization of features, behaviors, and associated functionality of the UI in the context of the UI being modified, without the need to navigate to a separate setup UI display screen, where the context information afforded by the runtime page would be lost.

Figure 9:
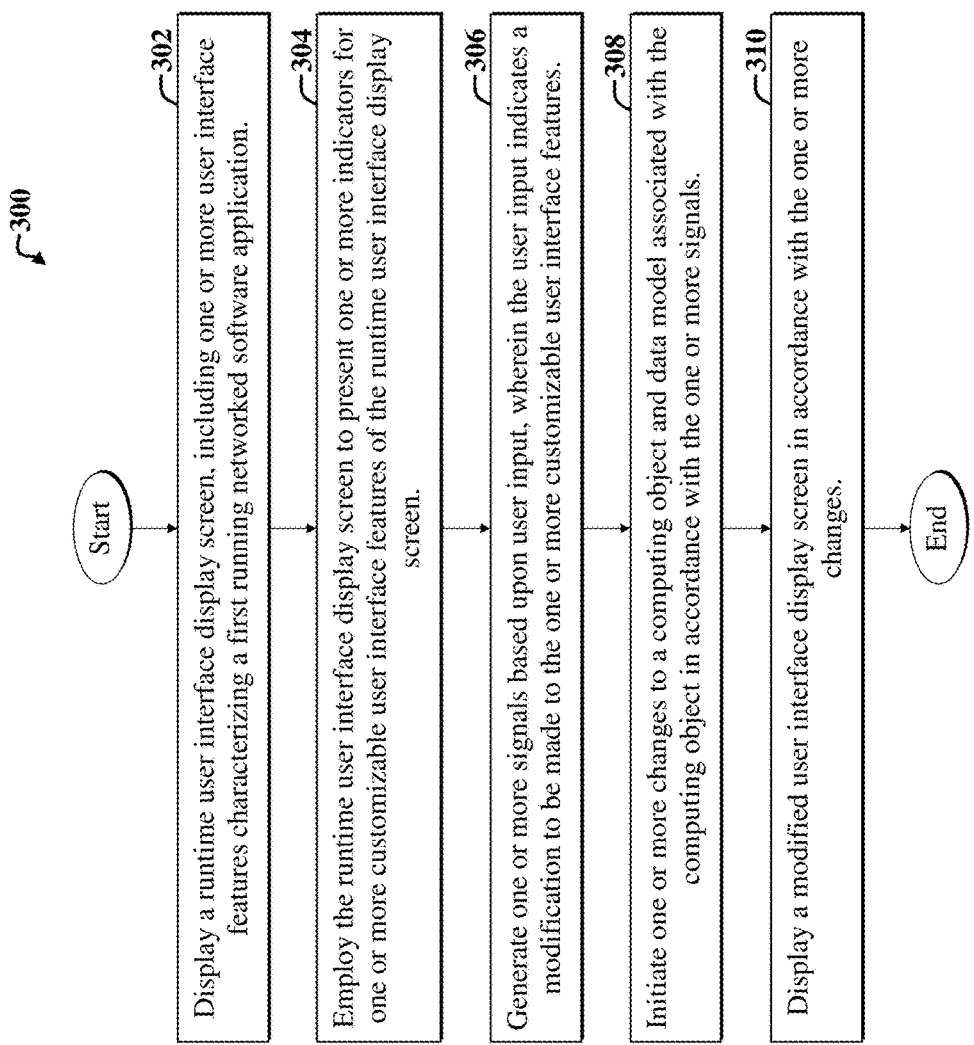
FIG. 9 is a flow diagram of an example method that is adapted for use with the embodiments of FIGS. 1-8.

FIG. 9 is a flow diagram of an example method 300 that is adapted for use with the embodiments of FIGS. 1-8. The example method 300 includes a first step 302, which involves displaying a runtime UI display screen, including one or more UI features characterizing a first running networked software application.

A second step 304 includes employing the runtime UI display screen to present one or more indicators, such as icons or other UI controls, for one or more customizable UI features of the runtime UI display screen.

A third step 306 includes generating one or more signals based upon user input, wherein the user input indicates a modification to be made to the one or more customizable UI features. The one or more signals may be sent, for example, from the setup controls 62 to the setup client 60 of the system 40 FIG. 2.

A fourth step 308 includes initiating one or more changes to a computing object and data model associated with the computing object in accordance with the one or more signals. The data model may be, for example, a data model characterizing the database 18 of FIG. 2 and/or a data model further characterizing the running application 56 of FIG. 2.

A fifth step 310 includes displaying a modified UI display screen in accordance with the one or more changes. The modified screen may represent a modified version of the first UI display screen 120 of FIG. 4, and/or related setup display screens 170, 210, 230, 260 of FIGS. 5-8, respectively.

Note that the method 300 may be modified or augmented, without departing from the scope of the present teachings. For example, the method 300 may further include initiating a first change, based upon the one or more signals, to the data model, wherein the data model characterizes a database containing the computing object.

The method 300 may further include making a second change to a UI model (e.g., the UI model 100 of FIG. 3) characterizing the runtime application, wherein the second change is at least partially based upon the first change. Hence, data model changes (e.g., first change) may result in corresponding UI model changes (e.g., second change), and vice versa.

The database may be accessible to different network resources, such as various enterprise software applications and/or web services, via one or more servers that comprise a portion of a networked computing environment. The database may include or otherwise communicate with the computing object.

The method 300 may further include employing middleware in communication with one or more setup software applications and the database to facilitate effecting the first change. The middleware is then employed to automatically communicate information characterizing the first change and/or the second change to a second running networked software application, thereby deploying changes to the network.

Hence, certain embodiments may combine usability of a web authoring tool with functionality of a software development kit, thereby facilitating efficient modifications to runtime UI display screens that automatically propagate to other applications using any modified objects. For example, a modification to an employee absence object made via one customizable UI, may result in the modification appearing in reports made by other software applications, and so on.

Although the description has been described with respect to particular embodiments thereof, these particular embodiments are merely illustrative, and not restrictive. For example, while various embodiments are discussed with respect to networked enterprise applications, embodiments are not limited thereto. Virtually any networked software application that demands both efficient UI and setup functionality and deployment and propagation of any UI modifications to resources of a network, may benefit through implementations of embodiments discussed herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method adapted for use with a user interface, the method comprising:
   displaying, in a default mode, to a user a runtime user interface display screen, wherein the runtime user interface display screen includes one or more customizable user interface features in an initial layout characterizing a first running networked software application, wherein the initial layout maintains each of the one or more customizable user interface features in their positions with respect to the runtime user interface display screen and wherein each of the one or more customizable user interface features are changeable;
   receiving a user input signal, initiated by the user, that switches the runtime user interface display screen from the default mode to a setup mode;
   in response to receiving the user input signal that switches the runtime user interface display screen from the default mode to the setup mode, employing the runtime user interface display screen to present one or more indicators for the one or more customizable user interface features of the runtime user interface display screen, wherein the one or more indicators include a first icon and a second icon;
   generating one or more signals based upon user input, initiated by the user, wherein the user input indicates a modification to be made to the one or more customizable user interface features;
   displaying, in response to the one or more signals, to the user the first icon adjacent to a particular one of the customizable user interface features, and the second icon between two of the customizable user interface features while maintaining the initial layout that maintains each of the one or more customizable user interface features in their positions with respect to the runtime user interface display screen, wherein the first icon when activated allows the particular one of the user interface features to be edited, wherein the second icon when activated allows a new user interface feature to be inserted between the two customizable user interface features, and wherein the first icon and the second icon are displayed on the runtime user interface display screen while in the setup mode;
   initiating the modification with one or more changes to a computing object and a data model associated with the computing object in accordance with activation, by the user, of the first and second icons;
   propagating the one or more changes to integration points to facilitate consistent interactions with other resources, a runtime application, and a database;
   adjusting interfacing code to ensure seamless integration between the runtime application and applications communicating therewith; and
   displaying to the user a runtime modified version of the runtime user interface display screen in accordance with the one or more changes, the runtime modified version having the initial layout that maintains each of the one or more customizable user interface features in their positions with respect to the runtime user interface display screen, wherein the runtime modified version does not include the first icon and the second icon.

2. The method of claim 1, further including initiating a first change, based upon the one or more signals, to the data model, wherein the data model characterizes a database containing the computing object.

3. The method of claim 2, wherein the runtime user interface display screen is for a runtime application and wherein the method further comprises making a second change to a user interface model characterizing the runtime application, wherein the second change is at least partially based upon the first change.

4. The method of claim 2, wherein the database is accessible to plural software applications via one or more servers that comprise a portion of a networked computing environment, wherein the database includes the computing object and is characterized by the data model,
   wherein the initiating the one or more changes to a computing object further includes employing middleware in communication with one or more setup software applications and the database to facilitate effecting the first change; and
   wherein the method further includes employing middleware to automatically communicate information characterizing the first change to a second running networked software application.

5. The method of claim 1, wherein the one or more customizable user interface features include one or more fields.

6. The method of claim 5, wherein the one or more fields include one or more custom fields, and further including selecting the one or more custom fields for display in the runtime user interface display screen based on context information associated with the runtime user interface display screen and the one or more custom fields and wherein the context information includes object context information, and wherein the one or more fields include one or more flexfields.

7. The method of claim 5, wherein the one or more customizable user interface features includes a user interface control.

8. The method of claim 5, wherein the one or more indicators includes an inline user interface control in proximity to the one or more fields.

9. The method of claim 8, wherein the one or more fields are associated with one or more computing objects.

10. The method of claim 8, wherein the inline user interface control includes a user interface control that is adapted to provide a first user option to trigger adding a new field in proximity to the inline user interface control.

11. The method of claim 8, wherein the inline user interface control includes a user interface control adapted to provide a second user option to edit a customized field.

12. The method of claim 8, wherein the inline user interface control includes a control adapted to provide a user option to trigger display of a dialog box.

13. The method of claim 12, wherein content and functionality provided via the dialog box is in accordance with context information present in the runtime user interface display screen and in proximity to the user interface control, and wherein the dialog box includes one or more user options for modifying the one or more customizable user interface features.

14. The method of claim 13, further including automatically propagating any changes to the runtime user interface display screen in response to user input provided via the dialog box to one or more computing objects accessible via the runtime user interface display screen; and automatically propagating a change to the runtime user interface display screen from a user interface layer to a data model layer in response to user selection of a user interface control adapted to facilitate saving and deploying the changes.

15. An apparatus comprising:
a digital processor coupled to a display and to a non-transitory processor-readable storage device, wherein the non-transitory processor-readable storage device includes one or more instructions executable by the digital processor to perform the following:
displaying, in a default mode, to a user a runtime user interface display screen, wherein the runtime user interface display screen includes one or more customizable user interface features in an initial layout characterizing a first running networked software application, wherein the initial layout maintains each of the one or more customizable user interface features in their positions with respect to the runtime user interface display screen and wherein each of the one or more customizable user interface features are changeable;
receiving a user input signal, initiated by the user, that switches the runtime user interface display screen from the default mode to a setup mode;
in response to receiving the user input signal that switches the runtime user interface display screen from the default mode to the setup mode, employing the runtime user interface display screen to present one or more indicators for the one or more customizable user interface features of the runtime user interface display screen, wherein the one or more indicators include a first icon and a second icon;
generating one or more signals based upon user input, initiated by the user, wherein the user input indicates a modification to be made to the one or more customizable user interface features;
displaying, in response to the one or more signals, to the user the first icon adjacent to a particular one of the customizable user interface features, and the second icon between two of the customizable user interface features while maintaining the initial layout that maintains each of the one or more customizable user interface features in their positions with respect to the runtime user interface display screen, wherein the first icon when activated allows the particular one of the user interface features to be edited, wherein the second icon when activated allows a new user interface feature to be inserted between the two customizable user interface features, and wherein the first icon and the second icon are displayed on the runtime user interface display screen while in the setup mode;
initiating the modification with one or more changes to a computing object and a data model associated with the computing object in accordance with activation, by the user, of the first and second icons;
propagating the one or more changes to integration points to facilitate consistent interactions with other resources, a runtime application, and a database;
adjusting interfacing code to ensure seamless integration between the runtime application and applications communicating therewith; and
displaying to the user a runtime modified version of the runtime user interface display screen in accordance with the one or more changes, the runtime modified version having the initial layout that maintains each of the one or more customizable user interface features in their positions with respect to the runtime user interface display screen, wherein the runtime modified version does not include the first icon and the second icon.

16. A non-transitory processor-readable storage device including instructions executable by a digital processor, the non-transitory processor-readable storage device including one or more instructions for:
displaying, in a default mode, to a user a runtime user interface display screen, wherein the runtime user interface display screen includes one or more customizable user interface features in an initial layout characterizing a first running networked software application, wherein the initial layout maintains each of the one or more customizable user interface features in their positions with respect to the runtime user interface display screen and wherein each of the one or more customizable user interface features are changeable;
receiving a user input signal, initiated by the user, that switches the runtime user interface display screen from the default mode to a setup mode;
in response to receiving the user input signal that switches the runtime user interface display screen from the default mode to the setup mode, employing the runtime user interface display screen to present one or more indicators for the one or more customizable user interface features of the runtime user interface display screen, wherein the one or more indicators include a first icon and a second icon;
generating one or more signals based upon user input, initiated by the user, wherein the user input indicates a modification to be made to the one or more customizable user interface features;
displaying, in response to the one or more signals, to the user the first icon adjacent to a particular one of the customizable user interface features, and the second icon between two of the customizable user interface features while maintaining the initial layout that maintains each of the one or more customizable user interface features in their positions with respect to the runtime user interface display screen, wherein the first icon when activated allows the particular one of the user interface features to be edited, wherein the second icon when activated allows a new user interface feature to be inserted between the two customizable user interface features, and wherein the first icon and the second icon are displayed on the runtime user interface display screen while in the setup mode;
initiating the modification with one or more changes to a computing object and a data model associated with the computing object in accordance with activation, by the user, of the first and second icons;
propagating the one or more changes to integration points to facilitate consistent interactions with other resources, a runtime application, and a database;

adjusting interfacing code to ensure seamless integration between the runtime application and applications communicating therewith; and displaying to the user a runtime modified version of the runtime user interface display screen in accordance with the one or more changes, the runtime modified version having the initial layout that maintains each of the one or more customizable user interface features in their positions with respect to the runtime user interface display screen, wherein the runtime modified version does not include the first icon and the second icon.

17. The method of claim 1, wherein the method further comprises:

automatically determining and propagating the one or more changes to web services, to application programming interfaces (APIs), and to any other requisite integration points.

18. The method of claim 17, wherein the method further comprises:

calling, performed by a client application executing the runtime modified version of the runtime user interface display screen, one or more of the web services and the APIs to access data and functionality provided by network resources.

19. The method of claim 1, wherein the adjusting further comprises:

updating multiple tiers of a networked software application based on the one or more changes.

20. The method of claim 1, wherein the adjusting further comprises:

providing user interface-driven extensibility for an enterprise application model by updating all tiers in multi-tier applications, including user interface, web service, business intelligence, import/export occurrences, in both single and cluster-based applications.

* * * * *

UNITED STATES PATENT AND TRADEMARK OFFICE
CERTIFICATE OF CORRECTION

PATENT NO. : 10,073,604 B2
APPLICATION NO. : 14/277993
DATED : September 11, 2018
INVENTOR(S) : Yu et al.

Page 1 of 1

It is certified that error appears in the above-identified patent and that said Letters Patent is hereby corrected as shown below:

In the Specification

In Column 6, Line 43, delete "14. 16." and insert -- 14, 16. --, therefor.

In Column 7, Line 16, delete "and or" and insert -- and/or --, therefor.

Signed and Sealed this
Ninth Day of July, 2019

Andrei Iancu
*Director of the United States Patent and Trademark Office*